_United States Patent_ [19]

Lillywhite et al.

[11] Patent Number: 4,840,283

[45] Date of Patent: Jun. 20, 1989

[54] DOUBLE SHELL THICKENER

[75] Inventors: M. James Lillywhite, Salt Lake City, Utah; Michael J. Horn, Owensboro, Ky.

[73] Assignee: Baker Hughes, Houston, Tex.

[21] Appl. No.: 123,745

[22] Filed: Nov. 23, 1987

[51] Int. Cl.⁴ ............................................. G01M 3/00
[52] U.S. Cl. .................................... 220/5 A; 220/445; 220/469
[58] Field of Search ............... 220/5 A, 1 B, 855, 901, 220/431, 444, 445, 465, 468, 469

[56] References Cited

U.S. PATENT DOCUMENTS

| | | | |
|---|---|---|---|
| 2,520,883 | 8/1950 | Kornemann et al. | 220/445 X |
| 2,531,159 | 11/1950 | Rowell | 220/1 B |
| 3,059,804 | 10/1962 | Wissmiller | 220/465 |
| 3,320,969 | 5/1967 | Gordon | 220/445 X |
| 3,337,079 | 8/1967 | Clarke et al. | 220/445 |
| 4,653,312 | 3/1987 | Sharp | 220/469 X |

Primary Examiner—Steven M. Pollard
Attorney, Agent, or Firm—Skjerven, Morrill, MacPherson, Franklin & Friel

[57] ABSTRACT

A double-walled thickener tank has an outer shell bottom and an inner shell bottom spaced by spaced bars with interconnected or discrete void spaces between the bars. An incompressible load-carrying permeable material such as oil-impregnated sand is compacted in the void spaces to provide a support for the inner shell bottom and confined fluid in the tank. Any leakage of fluid from the tank through the inner shell bottom is initially confined in the void spaces and conveyed down a slight slope on the top surface of the outer shell bottom so the leaking fluid drains into an interior space of a double-wall discharge cone at the center of the tank where the leak and void space are accessed to detect any leaking of fluid from the tank.

5 Claims, 3 Drawing Sheets

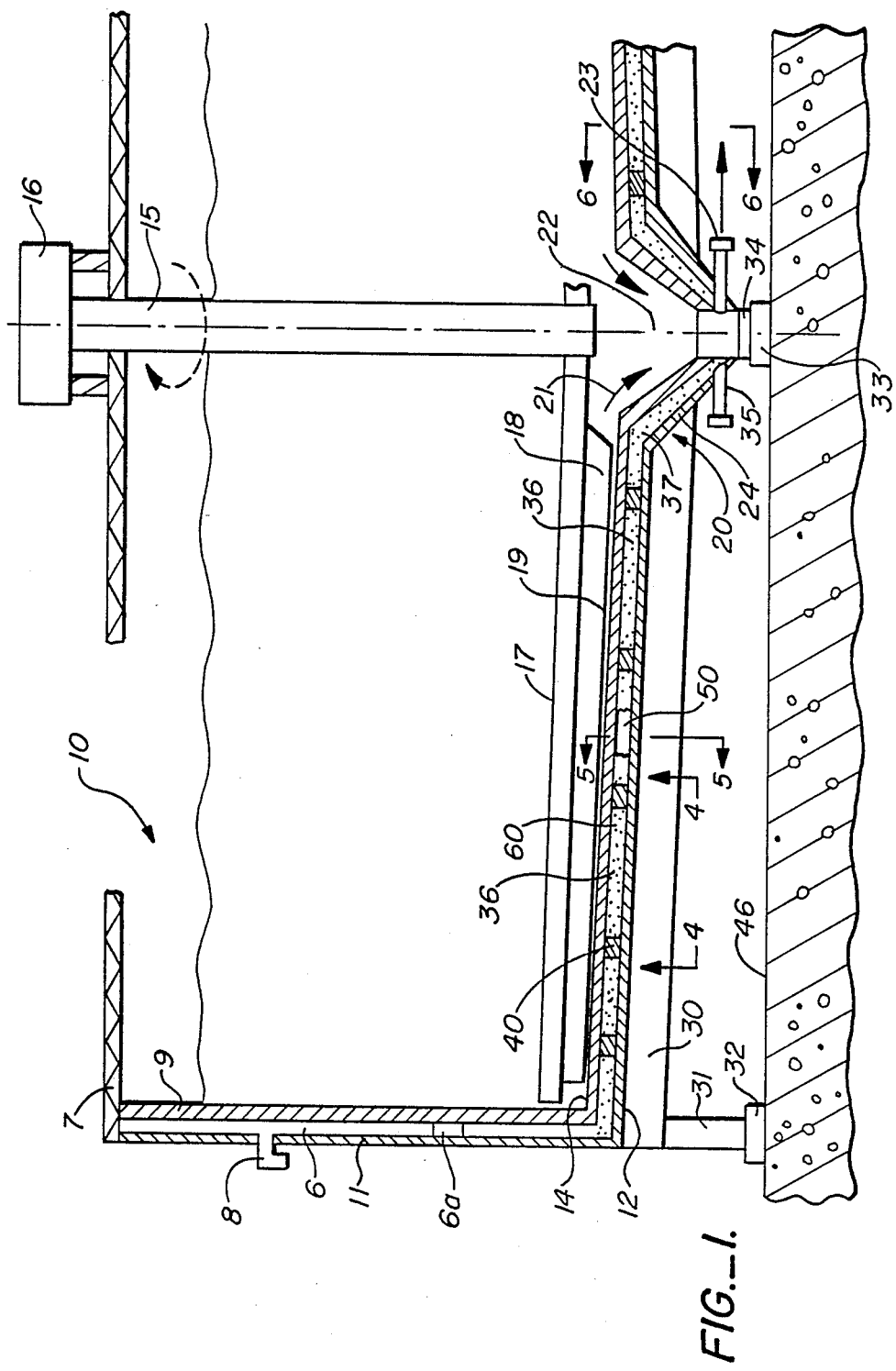
FIG._1.

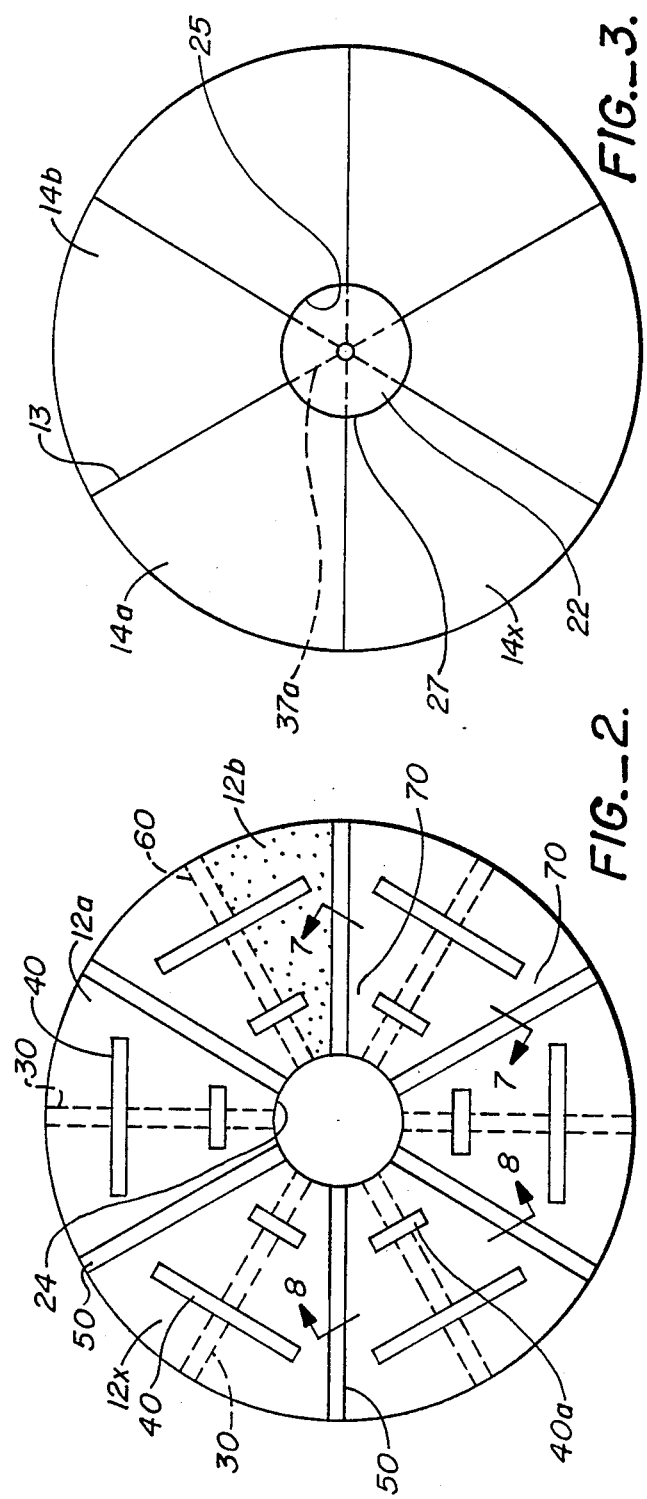
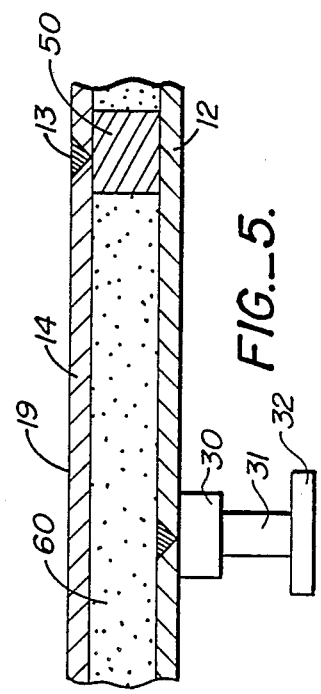
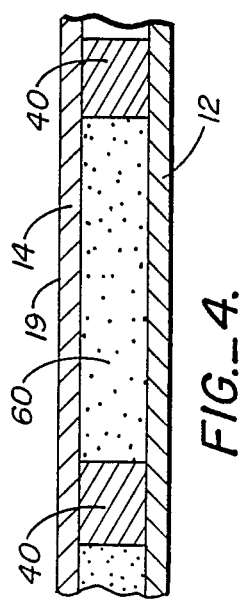

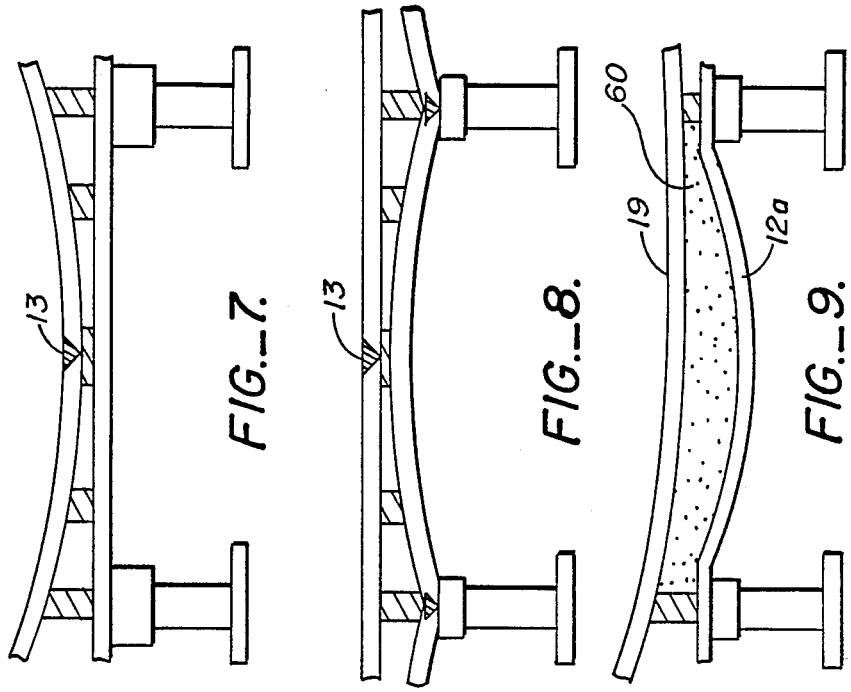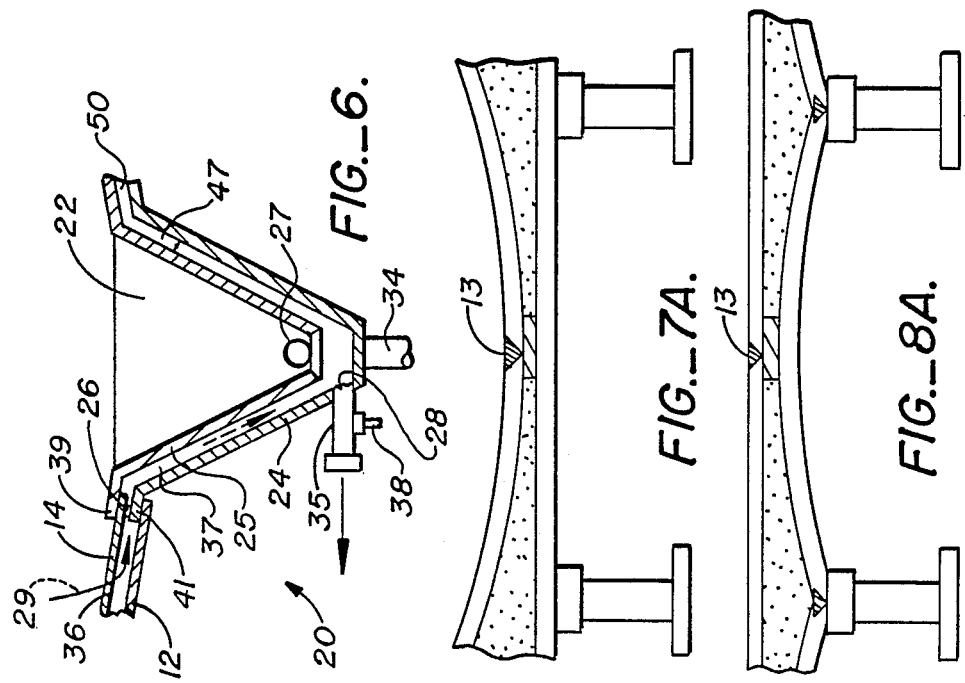

DOUBLE SHELL THICKENER

This invention relates to double-wall fluid containment tanks. More particularly, the invention is directed to a double-wall elevated thickener, clarifier or other equipment used in liquid-solid separation processes, including waste water treatment.

BACKGROUND OF THE INVENTION

Heretofore, most fluid containment tanks have been comprised of a single-wall construction including a single-wall side wall and a shell bottom for containing the fluid and for supporting the weight of the fluid in the tank. The shell bottom normally rests on wooden, steel beam or concrete supports resting on pylons or a ground support. When a toxic or other ground water damaging or medically hazardous material is to be confined, double wall containments have been mandated. Thus in the case of certain waste water treatment processes the U.S. Environmental Protection Agency (EPA) have required a double-wall containment. Wafer treatment equipment as mandated by the EPA typically comprise double-wall barriers made up of two totally separate tanks. As an example, a concrete floor with peripheral vertical concrete walls will be lined with a metal liner. Inside this large normally open-to-the-atmosphere containment, a steel elevated tank will be erected and utilized. Any leakage from the elevated tank will be captured and monitoried by means of the metal-lined concrete containment.

Other equipment has utilized double containment barriers. Scrubbers used in the Power industry utilize a liner (a corrosion-resistant thin material) laid directly against a heavier structural load carrying shell (noncorrosion resistant). Leakage is monitored in the annular area. Oil tankers also utilize double-barrier containments.

SUMMARY OF THE INVENTION

A double-wall tank construction is provided in which an inner shell bottom is supported over essentially all of its area and wherein any leakage from the interior of an overall inner fluid-holding containment is detectable by centrally accessing the space between the inner containment and an outer containment. A suitable load-carrying permeable material is preferably placed in void spaces formed by spacer bars erected between an outer shell bottom and the inner shell bottom which not only provides overall support for the inner shell and its fluid contents, but provides a material which allows for the flow of any fluid leaking from the inner shell into the space between the shells to be detected at multiple access detection locations or at a single detection location.

In a preferred embodiment the outer shell is first formed on suitable radial support beams which normally are leg-supported. The edges of pie-shaped steel sheets are mounted on and secured, as by welding, to the support beams to provide structural and seal integrity of the outer shell. Radial and segmented annular support bars are welded to the top of the outer shell and sand or other inert granular material is filled and compacted between the radial and annular support bars which space the outer and inner shell bottom from each other. The edges of other pie-shaped steel sheets which form the inner shell are then secured, as by welding, to rhe radial support bars to provide structural and seal integrity for the inner shell. In the case of a liquid-solid thickener such as those finding extensive application in waste water treatment the inner shell bottom is formed in a first inverse cone configuration to accommodate a rotating solids-moving rake structure which transports settled solids to a central sludge discharge cone attached to and extending through a central aperture in each of the inner shell bottom and outer shell bottom.

Means are provided for accessing one or more locations in the void spaces between the inner and outer shells for detection of any leaks through the inner shell into the void spaces. In the preferred embodiment access is provided by providing a double-wall sludge discharge cone which allows for drainage of leaked fluids from the interstices of the permeable material in the void spaces between the inner shall bottom and outer shell bottom to a suitable drainage nozzle extending from an outer wall of the discharge cone. A sludge discharge nozzle extends in the cone through both walls of the discharge cone to facilitate pumped removal of settled sludge from the discharge cone interior.

The unique features of this invention are: the inner shell is separated and supported from the outer shell by means of a combination of moldable incompressible material (oil impregnated sand) and bearing bars; inner tank fluid leakage is collected in one central area; leakage can freely flow to the central area since continuous annular supports are not required; the tank bottom outer shell is normally erected with a combination of flat plates in pie-shaped coned segments. This device allows the inner shell to be formed into a perfect cone to enhance the total swept area of a rotating rake arm; and corrosion is minimized by utilizing a minimal number of flow restrictions, i.e., bearing bars.

BRIEF DESCRIPTION OF THE DRAWINGS

FIG. 1 is a schematic half, partial cross-section side view of a thickener incorporating the invention.

FIG. 2 is a plan view of an outer shell bottom of a thickener tank at an interim step of tank erection.

FIG. 3 is a plan view of the tank inner shell bottom in tank assembled condition.

FIG. 4 is a cross-section view of a radial section of the tank bottom taken on the lines 4—4 of FIG. 1.

FIG. 5 is a cross-section view of an arcuate section of the tank bottom taken on the lines 5—5 of FIG. 1.

FIG. 6 is a cross-section side partial view of the discharge cone showing its connection with the tank outer and inner shell bottoms.

FIG. 7 is a cross-section view of a chord section taken on the lines 7—7 of FIG. 2 showing a series of spacer bars between the shells.

FIG. 7A is a cross-section view of a chord section similar to FIG. 7 with sand filling the void spaces between the outer and inner shell.

FIG. 8 is a cross-section view of an arcuate section taken on the lines 8—8 of FIG. 2 showing a series of spacer bars between the shells.

FIG. 8A is a cross-section view of an arcuate section similar to FIG. 8 with sand filling the void spaces between the outer and inner shells.

FIG. 9 is a schematic cross-section side view along a radial showing a modified scalloped form of outer liner.

DETAILED DESCRIPTION OF THE PREFERRED EMBODIMENT

As shown in FIG. 1 a double-wall bottomed thickener 10 comprises a circular vertical tank wall 11 surrounding and attached by welding or the like to the peripheral edges of an outer shell bottom 12 and an inner shell bottom 14 spaced therefrom by arcuate, i.e. preferably straight, sections extending laterally across an arc segment, spacers 40 and radial spacers 50. Each of the shown outer long arcuate spacers 40 and inner short arcuate spacers 40a extend for a distance less than the distance between adjacent radial spacers 50 forming gaps 70 there between allowing flow of leaking fluid therepast. The inner shell bottom has an inverse conical top surface 19 which receives settled solids or sludge from a solids-containing fluid contained in the tank formed by wall 11 and inner shell bottom 14. Wall 11 may be a double-wall, the interior 6 of wich between wall 11 and wall 9 is in flow communication with the space between outer shell bottom 12 and inner shell bottom 14.

As well known in the thickener art, typically a walkway truss 7 bridges across the tank and supports a rake drive mechanism 16. A central turbine shaft 15 extends into the tank from the drive mechanism and rotates one or more rake arms 17 affixed to the shaft end. Rake blades 18 extend downwardly along the rake arm. Blades 18 may include stainless stell or rubber squeegees on their bottom edges. Blade 18 rotates around tha tank bottom surface 19 to transport settled solids radially inwardly into a central discharge cone 20. Solid line arrows 21 illustrate the movement of sludge from surface 19 to the interior 22 of the discharge cone. A sludge outlet 23 extends from the cone interior and is connected to a sludge pump (not shown) for removal of settled sludge from the thickener and the discharge cone. Not shown in FIG. 1 are conventionally employed peripheral tank launders, weirs, sampling ports, reaction wells, baffling and influent piping, for example.

In order to support the weight of the fluid in the thickener 10 in the preferred embodiments, an inert, noncompressible, load-carrying material 60 fills the void spaces 36 between the shell bottoms 12, 14 and between the spaced arcuate and radial spacers extending in the space between the shell bottoms. In the preferred embodiment the void spaces are filled and compacted with oil-impregnated sand. Clean 30- mesh siliceous sand saturated with a heavy-base petroleum oil (motor oil) may be used.

Any leakage of fluid in the thickener tank either through the inner wall or the inner shell bottom 14 will drain into the permeable sand 60 and be conveyed by the inward slope, typically being at a slope rate of about 1:12 to about 2.5:12, along the outer shell bottom through the sand in void spaces 36 and past the arcuate and radial spacers 40, 50 into a downwardly sloping space 37 between the double walls of the discharge cone, and then to a leak detection fluid outlet nozzle 35 whch acceses the void spaces between the double side walls, the double-shell bottoms and the double discharge cone walls.

While the tank has been described in terms of a thickener tank, the tank may be used for clarification, floatation or as a simple storage tank for liquids or liquid— solids slurries.

Fabrication of the aforesaid structure is performed by providing suitable concrete pedestals 32, 33 on a concrete or other suitable ground support surface 46. Outer support legs 31, spaced around the tank periphery, support one end of a series of radial support beams 30 which are secured, as by welding, at their opposite ends onto the outer shell 24 of discharge cone 20. Discharge cone 20 may be supported by a center support leg 34 extending above pedestal 33.

As shown in FIG. 2 a series of pie-shaped steel sheets 12a, 12b, . . . , 12x, then are placed on and connected, as by radial edge welding, to the radial support beams 30 to form the outer shell bottom 12. The inner peripheral edges of the sheets are fitted to and connected, as by welding, to an angular flange extension 41 of the cone shell 24 (FIG. 6). Radial spacer bars 50 and segments of arcuate spacer bars 40 are spacedly positioned on the top of the outer shell bottom and sand 60 impregnated with oil for corrosion resistance is placed and compacted in the void spaces between and even with the top level of the upstanding spacers 40, 50. In the preferred embodiment the sand is smoothed into an inverse cone-like top surface corresponding to the desired slope of the top surface 19 of inner shell bottom 14. Sand is only used on the flatter surfaces of the tank bottom, not the central cone area. As seen in FIG. 7A the sand is brought up to a level adjacent to the tops of the bars and the bars remain exposed for welding. FIG. 7 shows bars of various heights between which sand is placed and contoured as seen in FIG. 7A.

Pie-shaped steel sheets 14a, 14b, . . . , 14x (FIG. 3) are then positioned with their edges abutting and in engagement with the tops of the radial spacer bars 50. The inner peripheral edges of the sheets 14a to 14x are inserted under an angular annular flange 39 of inner cone shell 25 (FIG. 6). The steel sheets are then secured in place by a seam weld 13 (FIG. 3) preferably connecting the adjacent abutting steel sheets to their underlying radial spacer bar 50. The inner shell bottom is spaced above the outer shell bottom a distance of ⅜"–1" depending upon the diametric size of the tank and where along the radial surface of the tank bottom surface 19 the measurement is taken. In a typical 25 foot ID tank having a 10 foot vertical wall, ⅜" thick steel sheets are utilized for the inner and outer shell bottoms.

The walls of the tank are also of double-wall construction having gapped vertical spacer bars 6a therebetween for providing the void between the liner and outer shell. However, in constrast to the bottom this void typically is not filled with sand or other material. In the event that additional wall strength is required, it is however contemplated that an incompressible yet permeable material such as sand or a perforated honeycomb structural insert could be provided in this void in the wall.

One or more spaced vacuum release fittings 8 extend from the tank exterior into the space 6 between the walls 9 and 11 to provide for relief of any vacuum in the void spaces and provide air column pressure to assist in leak drainage to the discharge cone.

The use of double-wall construction with sand (or other suitable load-carrying, permeable material) therebetween enables the upper surface 19 of the bottom of the tank to assume the desired shape. As best shown in FIG. 5 and because the radial support beams for the elevated tank and the pie-shaped sheet steel outer shell segments are of generally planar construction, their assembly to form the bottom of the tank cannot conform to a conical surface. The use of a flowable, yet load-carrying material such as sand between the inner liner and outer shell allows the necessary dimensional accommodation between the desired upper conical surface and lower planar approximation thereto. This explains the range of distances between corresponding points on the upper liner and lower outer shell. Of course, a conical surface as opposed to a planar approximation thereof enables the rake arms to sweep the bottom 19 of the tank clean rather than leaving pockets of unremoved material which can then ferment. This is important for tanks used to handle organic matter which could become septic if left unremoved.

The double-wall construction allows any leakage through the liner to be collected and detected as an exit from the space between the inner shell bottom and the outer shell bottom to prevent contamination of the environment with hazardous chemicals or other materials as may be required by the EPA.

FIG. 4 shows a detail of the spacing between outer shell bottom 12 and inner shell bottom 14 by arcuate spacer bars 40. Oil-impregnated sand 60 is shown compacted in the void space between bars 40. FIG. 5 shows a detail of the above spacing adjacent a radial spacer bar 50 with oil-impregnated sand 60 in the adjacent void spaces.

FIG. 6 illustrates in detail the connection of the inner annular peripheries of the shell bottoms with the double-walled discharge cone 20. The discharge cone has circular flanges 39, 41 which receives the shell bottoms. A series of $\frac{1}{4}"\times 2"\times 2"$ spaced spacer bars 26 allow drainage of leaked fluid from the space 36 between the shell bottoms 12, 14 into the space 37 between cone walls 24, 25. As shown by the dotted arrow 29 any leaks from the tank 10 through inner shell bottom 14 (or through vertical inner wall 9 into space 36—FIG. 1) is drained through the granulated material and conveyed by the slope of the inner surface of cone wall 24 to the bottom of the cone where the leakage and spaces 36, 37 are accessed by nozzle 35. A suitable fixed screen 28 retains any sand which is purposely or inadvertently found in the cone interior wall space 37. A suitable standard liquid detector and monitor with suitable alarm, attached to nozzle 35 or an enclosed Plexiglas sight glass may be provided to visually observe any leakage.

The double-wall construction allows a supply of air or nitrogen or other suitable gas to be provided to the void space 36 through inlet 38 or through one of the valve fittings 8 for detecting the existence of leaks in the inner liner by visually observing gas bubbles appearing at the top of the liquid in the tank or by a drop in supply gas pressure indicative of a leak in the fluid containment.

The use of spacer bars of a predetermined length, configuration, and placement in the void spaces can enable the tank to be divided into a number of independent void spaces for detecting leaks in predetermined portions of the tank. In this regard, the spacer bars may be used to divide the bottom of the tank into relatively small pie-shaped sections and the wall divided into a plurality of arcuate nonconnected sections if so desired. As seen by dash lines 37a in FIG. 3, similar discrete sections can be provided (FIG. 6) in the discharge cone by providing longitudinal spacers 47 in the cone space 37 connected to each radial bar 50, and separate leak detector nozzles attached to each discrete pie-shaped segment section, formed between each of the longitudinal cone spacers, at the cone discharge bottom. Referring to the drawing and the tank liner detail thereof, it is apparent that the wall voids can be separated and made independent of the void spacers in the bottom of the tank. Alternatively the wall void spaces can be placed in communication with a suitable nozzle(s) accessing the void space(s).

As seen in FIG. 9, if a scalloped bottom is used (as is done frequently on elevated tanks greater than 60 foot diameter) the inner sloped liner 19 may be spaced from $\frac{3}{8}"$ to several feet (adjacent the low point of the scalloped section 12a) from the bottom tank shell.

The above description of embodiments of this invention is intended to be illustrative and not limiting. Other embodiments of this invention will be obvious to those skilled in the art in view of the above disclosure.

We claim:

1. A tank system comprising:
   a series of support beams normally placed on a support;
   a first series of steel sheet segments supported on and welded to said support beams, said segments forming an outer shell bottom of a tank;
   a series of spaced spacer bars positioned on top surfaces of said outer shell bottom and having void spaces extending between said bars;
   a load-carrying permeable material filling in said void spaces;
   a second series of steel sheet segments supported on said permeable material and having edges mounted on said spaced spacer bars, said second series of segments forming an inner shell bottom spaced from said outer shell;
   an upstanding tank wall attached to peripheral portions of said outer and inner bottom shell;
   means accessing said void spaces and permeable material for detecting leaks of fluid, confined by said inner bottom shell and said tank wall, into said void spaces and through said permeable material;
   a central sludge cone extending from an inner periphery of said first and second series of segments forming said outer shell bottom and said inner shell bottom, said sludge cone comprising spaced concentric inner and outer cone sections having a hollow interior in flow communication with said void spaces; and
   wherein said means accessing said void spaces includes a drainage nozzle accessing said hollow interior of said sludge cone.

2. The system of claim 1 wherein a screen is positioned with respect to said drainage nozzle to prevent exit of permeable material from said void spaces and from said hollow interior of said sludge cone.

3. A tank system comprising:
   a series of support beams normally placed on a support;
   a first series of steel sheet segments supported on and welded to said support beams, said segments forming an outer shell bottom of a tank;
   a series of spaced spacer bars positioned on top surfaces of said outer shell bottom and having void spaces extending between said bars;
   a second series of steel sheet segments having edges mounted on said spaced spacer bars, said second series of segments forming an inner shell bottom spaced from said outer shell;
   an upstanding tank wall attached to peripheral portions of said outer and inner bottom shell; and
   means accessing said void spaces for detecting leaks of fluid, confined by said inner bottom shell and said tank wall, into said void spaces and passed by spacer bars;
   a central sludge cone extending from an inner periphery of said first and second series of segments forming said outer shell bottom and said inner shell bottom, said sludge cone comprising spaced concentric inner and outer cone sections having a hollow interior in flow communication with said void spaces; and wherein said means accessing said void spaces includes a drainage nozzle accessing said hollow interior of said sludge cone.

4. The system of claim 3 in which said tank system is a solids/liquid thickener/clarifier and in which said inner shell bottom is inversely conical, said system including at least one rake arm circumferentially movable in said tank to scrape settled solids on said inner shell bottom to a center solids discharge cone connected to said inner shell bottom.

5. The system of claim 4 wherein sand is compacted in said void spaces between said spacers to a level so as to be in contact with and to support said inner shell and its contents.

* * * * *

UNITED STATES PATENT AND TRADEMARK OFFICE
CERTIFICATE OF CORRECTION

PATENT NO. : 4,840,283

DATED : June 20, 1989

INVENTOR(S) : M. James Lillywhite, et al

It is certified that error appears in the above-identified patent and that said Letters Patent is hereby corrected as shown below:

Title page, Abstract, line 13, "space" should read --spaces--

Column 3, line 13, "wich" should read --which--

Column 3, line 54, "whch" should read --which--

Column 4, line 33, "3/8"-1" " should read --1/4 "-1"--

Column 4, line 37, "3/8" " should read --1/4"--

Column 6, line 4, "3/8" " should read --1/4"--

Signed and Sealed this

Twenty-fifth Day of June, 1991

Attest:

HARRY F. MANBECK, JR.

*Attesting Officer*

Commissioner of Patents and Trademarks